(12) United States Patent
Peterson

(10) Patent No.: US 7,493,724 B1
(45) Date of Patent: Feb. 24, 2009

(54) FISHING LURE OSCILLATOR

(76) Inventor: Timothy George Peterson, 4632 Balsam St., Medina, MN (US) 55359

( * ) Notice: Subject to any disclaimer, the term of this patent is extended or adjusted under 35 U.S.C. 154(b) by 147 days.

(21) Appl. No.: 11/367,879

(22) Filed: Mar. 4, 2006

Related U.S. Application Data

(60) Provisional application No. 60/659,023, filed on Mar. 5, 2005.

(51) Int. Cl.
A01K 85/00 (2006.01)
(52) U.S. Cl. .......... 43/42.03; 43/42.17; 43/42.18; 43/42.47; 43/42.46; 43/42.5
(58) Field of Classification Search ............ 43/42.02, 43/42.03, 42.17, 42.18, 42.07, 42.47, 43.13, 43/42.22, 42.28, 42.46, 42.19, 42.31, 44.89, 43/42.5, 42.51, 42.52, 42.74, 42.36, 27.2, 43/27.4, 37, 42.2, 42.23
See application file for complete search history.

(56) References Cited

U.S. PATENT DOCUMENTS

| | | | | |
|---|---|---|---|---|
| 510,205 A * | 12/1893 | Stiner | ............... | 43/17 |
| 613,519 A * | 11/1898 | Junod | ............... | 43/42.19 |
| 702,955 A * | 6/1902 | Johnson | ............... | 43/43.1 |
| 747,976 A * | 12/1903 | Junod | ............... | 43/42.2 |
| 781,794 A | 2/1905 | Smith | | |
| 900,139 A * | 10/1908 | Welch et al. | ............... | 43/43.13 |
| 982,974 A * | 1/1911 | Miller | ............... | 43/42.36 |
| 1,264,379 A * | 4/1918 | Doering | ............... | 24/697.2 |
| 1,297,354 A | 3/1919 | Jay | | |
| 1,444,338 A * | 2/1923 | Doering | ............... | 43/42.32 |
| 1,934,158 A | 11/1933 | Yarvice | | |
| 2,223,922 A * | 12/1940 | Schofield | ............... | 43/42.74 |
| 2,234,943 A * | 3/1941 | Nyman | ............... | 43/43.13 |
| 2,273,209 A * | 2/1942 | Louthan | ............... | 43/43.13 |
| 2,570,404 A * | 10/1951 | Stirlen | ............... | 43/42.32 |
| 2,638,698 A | 5/1953 | Eppinger | | |
| 2,759,290 A * | 8/1956 | Strausser | ............... | 43/42.72 |
| 2,775,839 A | 1/1957 | Kuslich | | |
| 2,821,043 A | 1/1958 | Parker | | |
| 2,821,044 A * | 1/1958 | Bateman | ............... | 43/42.16 |
| 3,357,123 A * | 12/1967 | Kurlovich | ............... | 43/42.2 |
| 3,359,676 A * | 12/1967 | Crossan | ............... | 43/44.97 |
| 3,568,351 A * | 3/1971 | Perrin | ............... | 43/17.1 |
| 3,570,166 A | 3/1971 | Borton | | |
| 4,499,682 A * | 2/1985 | Davis et al. | ............... | 43/42.19 |
| 4,658,535 A * | 4/1987 | Anderson | ............... | 43/42.5 |
| 4,920,687 A * | 5/1990 | Barnett | ............... | 43/42.74 |
| 5,058,309 A * | 10/1991 | Firmin | ............... | 43/42.13 |

(Continued)

*Primary Examiner*—Michael R Mansen
*Assistant Examiner*—Joshua J Michener
(74) *Attorney, Agent, or Firm*—Haugen Law Firm PLLP; Frederick W. Niebuhr

(57) ABSTRACT

A fishing lure oscillator, comprising a bent, oblonged, essentially elliptical foil having relatively uniform thickness. Near one end of the foil, a connection is made to an appendage, and near the opposite end of the foil a connection is made to another appendage. Both appendages, serving as a framing device to support the foil, originate from a common base which is adapted to be joined with a fishing lure. When joined with a lure and pulled through a body of water, an outwardly contoured portion of the foil is disposed directly against the flow of water whereby the force of water against the resisting face of the foil causes the foil to pivot freely within the framing device, thus transferring the resulting oscillation to the lure for the purpose of attracting and catching fish.

9 Claims, 5 Drawing Sheets

U.S. PATENT DOCUMENTS

| | | | |
|---|---|---|---|
| 5,113,608 A * | 5/1992 | Hook | 43/42.49 |
| 5,887,378 A | 3/1999 | Rhoten | |
| 5,918,406 A | 7/1999 | Wilson | |
| 5,970,648 A * | 10/1999 | DeRose | 43/42.33 |
| 6,301,823 B1 * | 10/2001 | Monticello et al. | 43/42.5 |
| 6,349,498 B1 * | 2/2002 | Garratt | 43/42.06 |
| 6,493,983 B1 * | 12/2002 | Lewko | 43/42.5 |
| 7,162,829 B2 * | 1/2007 | Braaten | 43/42.23 |

* cited by examiner

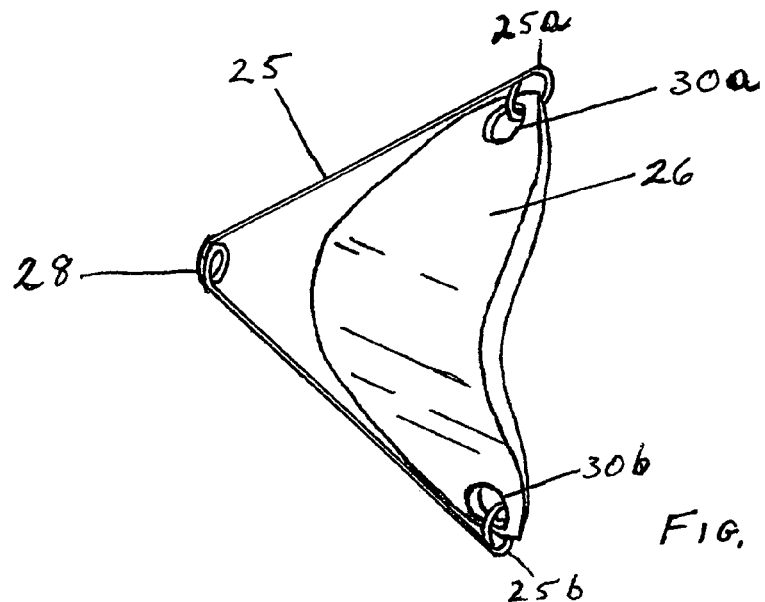
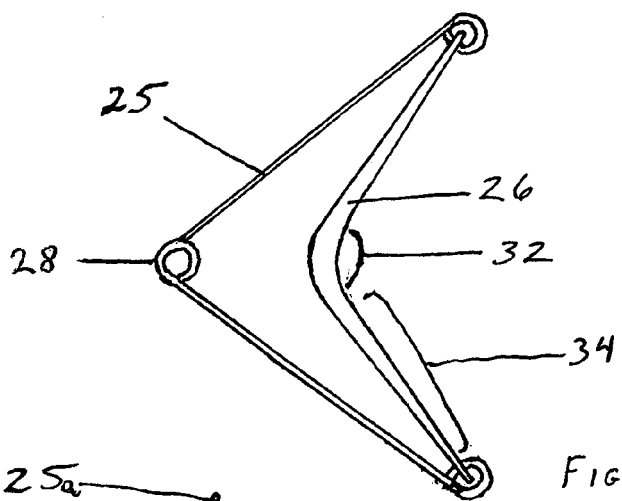
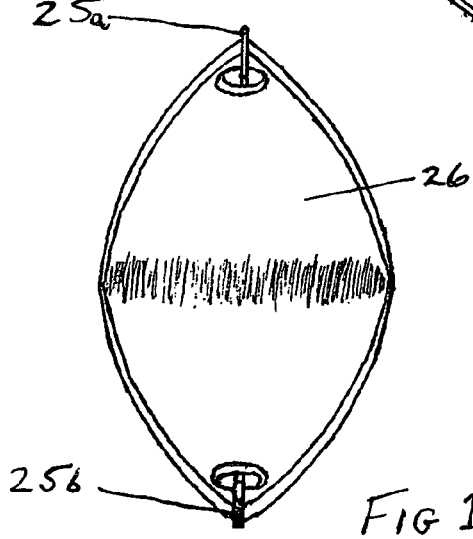
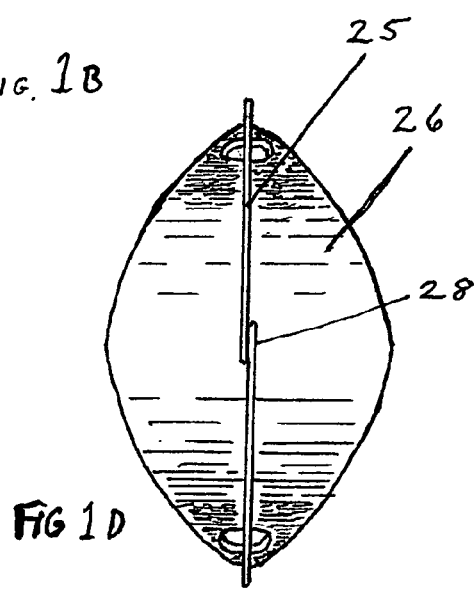
FIG. 1A
FIG. 1B
FIG. 1C
FIG. 1D

FISHING LURE OSCILLATOR

CROSS REFERENCE TO RELATED APPLICATIONS

This application claims the benefit of provisional patent application Ser. No. 60/659,023 filed 2005 Mar. 5, by the present inventor

FEDERALLY SPONSORED RESEARCH

Not Applicable

SEQUENCE LISTING

Not Applicable

BACKGROUND OF THE INVENTION a. Field of Invention

The present invention pertains generally to fishing lures and other devices such as flashers, dodgers, and trolling rigs, and specifically to fishing lure accessories that are coupled with fishing lures for the purpose of enhancing fish-attracting oscillation.

b. Description of the Background

Fishing lures are made in a myriad of shapes, sizes, weights, colors, functions, materials, and types to attract fish and, individually, are generally confined and dependent upon specific means to simulate the swimming motions of real fish: various weight placement in their bodies; or water deflecting blades positioned in the front to resist water causing the lure to wobble; or unique body design to enhance a swimming effect.

Spinnerbait-type and buzzbait lures have a rotatable blade for flash and vibration and a skirted hook. Jigs have a weighted front portion and soft plastic members covering the hook. Spoons have unique shapes to enable a fish-attracting wobble. Swimbaits generally have a swimming motion resembling a minnow and are made of soft or hard plastic, or wood. Dodgers and flashers made of plastic or metal are designed for trolling rigs to provide flash and motion transference to other lures. In-line spinner-type lures have a trailing minnow body, skirts or hair and a leading, frontal metal spinning blade.

Soft plastic worms, minnows, crawfish, and a variety of other shapes and sizes can be combined with different but limited lure types, and components such as spinning blades and propellers are interchangeable across lure types.

In addition to the physical limitations of current lure design, another shortcoming to lure design is identified, specifically in lures possessing motion-activating devices disposed in the frontal portion of lures, particularly in minnow plugs, crankbaits, swimbaits, and in-line spinners. In the current art, the predominant frontal motion activators of lures are deflective lips and blades, or flat leading portions of lures; this is the direct opposite end from which real minnows derive their swimming motion. In order for a buoyant plug or crankbait to swim and dive, it must have means to deflect water from the front of the body. The problem with attaching a deflector lip on the trailing end of a plug or crankbait is that it is difficult to make the lure dive, due in part, to the angle of the line. Without resistance up front, the lure is oriented on an angle with the nose up and the tail down and thus, inhibiting a desirable presentation that simulates a real minnow. Therefore, it would be an improvement to apply a new design to the tail end that allows a lure to swim with its nose downwardly disposed and swim with its tail.

Another issue with plugs and crankbaits is the delicate construction of the lures regarding weight alignment and distribution. As those skilled in the art would appreciate, these lures are finely tuned with respect to the weight distribution and tail ends of the lures. Even though a real minnow swims with its tail, it's worthy to emphasize that relatively few, if any, have succeeded in creating hardbaits that derive their action from a tailpiece.

Not only does the current art fall short in disclosing hardbaits having motion-activating, non-rotating blades mounted on their tail ends, none has been found to disclose a tailpiece that imparts an up and down oscillation resembling that of a dying minnow lying on its side. It is well known in the sportfishing industry that a wounded and dying minnow is easy prey for a predator fish. Fishermen, through the years, have struggled to provide a hardbait with the coveted up and down action of a dying minnow. In turn, many lures over the years have been introduced, attempting to emulate that particular action, but have realized very little success.

Insofar as the current art is able, it has not disclosed a commercially viable or suitable plug, crankbait, or jig with the versatility to swim with a tailpiece that can be adjusted to produce either a side to side or an up and down oscillation. Further, it has not disclosed a deflector-type lure device that can be attached to most lure types in a vertical or horizontal orientation. Therefore, it would be desirable to provide more versatility to a lure by attaching a device for a particular presentation rather than purchasing a different lure.

In the related background art, specifically to the art that incorporates various types of pivoting blades, disks, and vanes, a few shortcomings have been identified. Most of these lures with blade/disk-type devices place their piece on the leading end of the lure. Thus, there is no substantial differentiation between the actions of these lures and the standard motion-activators found on conventional plugs and crankbaits. Further, these blades and disks are disposed with a concave surface facing the water flow when pulled through the water. Although a substantial amount of resistance creates an action on these lures, the disposition of such pieces do not allow for a stable swimming posture of the lure wherein the lure will roll on its side, or it will not swim at a consistent depth.

Additionally, most of the related art with disk-type pivotal, non-rotating motion activators employ a connection to the center of the piece which restricts the natural movements of which lures are designed to simulate. A trailing blade having connections at both the blade's ends and a convexed central portion freely pivoting against water flow would be more practical and provide for a smoother and natural motion.

Appearance of a lure plays a large part in its commercial success. A design that has a more natural resemblance to live bait is more favorable to fishermen than unnatural designs. Lures with bulky, unnatural-looking metal or plastic disks attached to the head, middle, or tail portion do not resemble any aquatic creatures insofar as gamefish are able and likely to eat.

Most of the prior art motion devices are integral to a lure and are not interchangeable with other lure types, nor are they designed to do so. Others are superfluous in design and construction resulting in relatively complex mechanisms, and thus, contributing to higher material, labor, and manufacturing costs.

Accordingly, as recognized by the present inventor, there is a need for a lure accessory that provides alternative motions to multiple lure types whereby the accessory can be placed in multiple positions on lures to minimize the limitations inherent in fishing lures of the prior art. Therefore, it is desirable to provide a single, mechanical lure accessory which combines substantially all of the desirable benefits fragmentally found in the multitude of products designed to attract fish. Such benefits include: versatility of function and application to multiple lure types; aesthetical appeal to both fisherman and fish; practicality in application; simplicity in concept, design, and construction; simulative function; and inexpensive manufacturing.

As such, the present invention substantially departs from the customary functional, utilitarian, structural, and limiting designs found in the prior art. At the same time, the present invention allows existing lures to favorably exceed their restrictions and limitations.

SUMMARY OF THE INVENTION

In accordance with the present invention, a fishing lure oscillator comprises a bent oblonged, essentially elliptical water-deflecting foil in the relative uniformed thickness of sheeted material. Near one end of the foil, a connection is made to one appendage, and near the opposite end of the foil a pivotal connection is made to another appendage. Both appendages serve as a framing device to support the foil, and originate from the base of the frame which is adapted to be joined with a lure. When joined with a lure and pulled through a body of water, a convex portion created by the bend in the foil is disposed directly against the water flow whereby the force of water against the resisting foil causes the foil to pivot within the framing device, thus transferring the resulting oscillation to the lure for the purpose of attracting and catching fish. Various orientations, positions, modifications, and adjustments can be utilized to control oscillation and depth of a lure. A variety of materials can be used for both the foil and framing device including metal, plastic, and wood. In the effort to merely form a tailpiece out of wire and sheet material, the present invention proved to have unexpected functional capabilities and applications. As a result, a number of embodiments and uses were discovered.

In one embodiment, the appendages are integrally formed into a substantially v-shaped frame and the foil is pivotally mounted at each of its ends to respective appendages. The base of the frame is adapted to attach to a fishing line, or to the front, rear, side, top, or bottom of multiple lure types, including, but not limited to, minnowbaits/plugs, crankbaits, spinnerbait-types, buzzbaits, in-line spinner-types, jigs, swimbaits, spoons, and bladebaits. With some of these lure types it can be attached directly to the hook.

In another embodiment of the present invention, the foil is integrally formed with the frame wherein the pivot point is disposed at a connection to a line or lure. This embodiment can be attached to multiple lure types.

The versatility of the present invention speaks to the placement, orientation, and resulting action on multiple lures wherein the present invention can be oriented in a vertical or horizontal position with reference to the foil's longitudinal axis and the surface of the water. It can be attached to multiple lures either vertically or horizontally on the side, top, bottom, front, rear, or between body parts as in jointed lure types. In the horizontal position, the foil imparts a vertical oscillation to a lure. Likewise, in a vertical position, the foil imparts a horizontal oscillation to a lure.

DRAWINGS—FIGURES

FIGS. 1A-1D show various views of a preferred embodiment with the frame and foil. FIG. 1A is a perspective view, FIG. 1B a side view, FIG. 1C a rear view, and FIG. 1D a front view.

DETAILED DESCRIPTION OF THE INVENTION

A preferred embodiment of the invention is illustrated in different views in FIGS. 1A-1D. FIG. 1A is a perspective view, FIG. 1B is a side view, FIG. 1C a rear view, and FIG. 1D a front view.

The fishing lure oscillator in the embodiment comprises a frame 25 formed from a safety pin coil spring formation hereinafter referred to as "connector" 28. Connector 28 is used as a pivotal attachment device that connects the frame to a fishing lure or fishing line. Two appendages of frame 25 branch out from connector 28 giving the frame a substantially v-shaped configuration with the connector defining an apex of the v-shaped frame. Each appendage terminates at closed loops 25a and 25b. The frame and loops are integrally formed from a single length of relatively stiff stainless steel wire. Each appendage forms a somewhat straight line from the apex to the loops, but can also be formed with a bend or curve.

The angle of frame 25 formed by the diverging appendages has minimal limitations wherein the angle can range from 20° to 160° depending upon the desired length of the appendages and other factors described below. In the present embodiment, a preferred angle ranges from 50° to 90°. In some applications, the angle is adjusted for a desired effect on a lure.

Since the angle of the frame appendages has minimal limitations, the shape of frame 25 is not as critical to the invention's function as are the positions of the closed loops to the proper function of the invention. This will be expanded upon further on in this description.

In some applications, the frame appendages have unequal lengths providing depth control to particular lures, but generally, appendage lengths vary between different lures and techniques.

Figure 8:
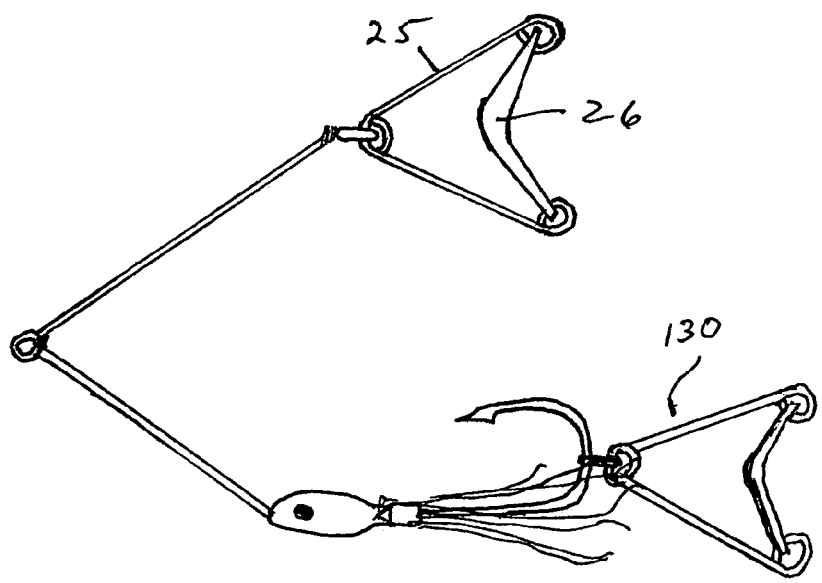
FIG. 8 shows a vertically positioned oscillator having been substituted for a spinning blade of a standard spinnerbait lure; a horizontally positioned oscillator is also an option (not shown). An additional oscillator is shown to illustrate how an oscillator can be attached to a hook.
Figure 9:
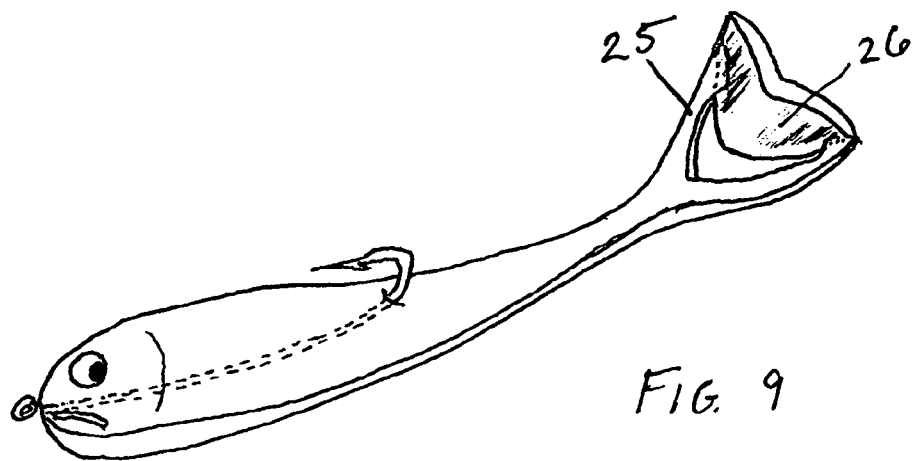
FIG. 9 illustrates a frame and foil as integral sections of a fishing lure.
Figure 10:
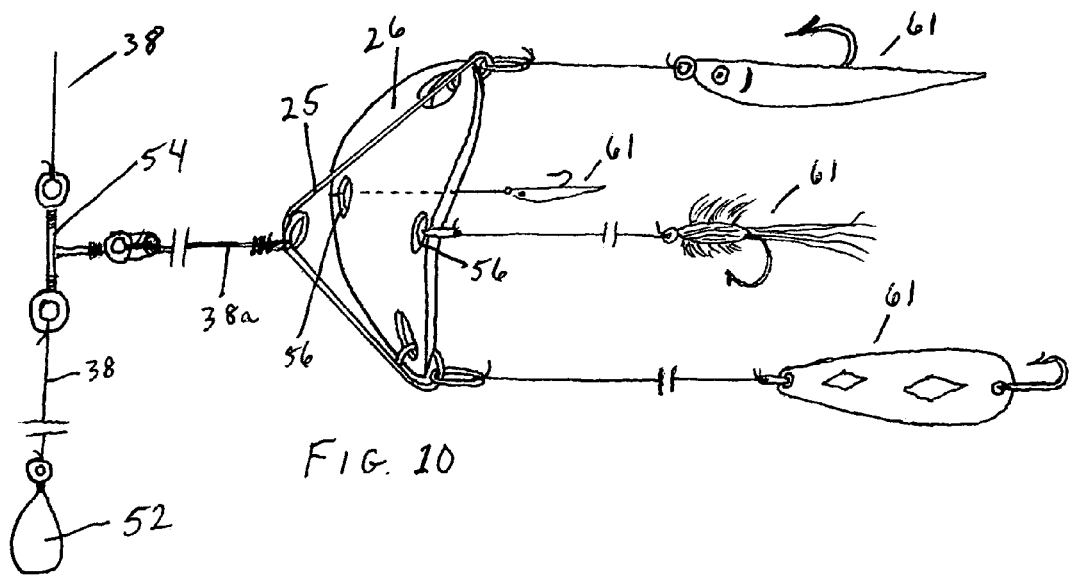
FIG. 10 shows an oscillator having been attached to a leader and being used as a dodger/flasher-type device commonly used in trolling rigs with a weight and trailing lures.

Connector 28 can also employ an optional split ring to connect the frame to a lure or fishing line, and FIG. 8 shows how frame 25 is connected to at least one hook.

Referring to FIGS. 1A, 1C, and 1D, the present embodiment comprises an oblong-shaped, substantially elliptical, water-deflecting foil 26 composed of sheet material of relatively uniform thickness. In FIG. 1A, one hole 30*a* is positioned near one end of the foil, another hole 30*b* is positioned near the opposite end of the foil relatively centered along the blade's longitudinal axis. To accommodate a pivotal connection to the frame 25, one closed loop 25*a* is linked through one hole 30*a* of foil 26 and the opposite loop 25*b* is linked through the opposite hole 30*b* of the foil. The holes 30*a* and 30*b* are sufficient in size to allow foil 26 to freely pivot around a portion of the line loops 25*a* and 25*b*, but are also used to limit the distance at which foil 26 pivots.

In FIG. 1B, foil 26 has a rounded bend across the longitudinal axis of foil 26 forwardly disposed and projecting towards connector 28 of frame 25. The radius of the foil in this embodiment is formed near the central portion of foil 26 thereby enabling the foil to maintain a substantially flat section 34 on each side of the bend of foil 26. In another embodiment, however, the bend may have a radius spanning from one end of the foil to the other end (not shown). In the present embodiment, angle 32 created by the bend ranges from 110° to 150° and is dependent upon the desired effect on a lure in particular fishing techniques and lures. However, angles ranging from 30° to 170° can be employed depending on lure types and fishing techniques.

The shape of the foil, in a generally elliptical configuration, is relatively narrower at its ends than at its center. This enables the appendages of frame 25 to aid in limiting the distance at which foil 26 pivots. The length and width of the foil can vary depending on the size of the lure to which it is attached, however, for scale, a preferred size foil 26 for a minnow plug lure of 85 mm, for example, has a length of approximately 25 mm, and a width of approximately 17 mm. The preferred material for the foil is composed of plastic such as polycarbonate. However, metal, wood, soft plastic, polyurethane foam, and others can be used for different applications such as for spinnerbait-type lures and soft plastic lures. These materials can be substituted for another depending on the desired weight and/or function of a particular lure.

The bend in the foil may also be outwardly contoured in a plurality of sections of the forward facing surface area. It may also have a hard crease or fold (not shown) in place of a rounded bend. Those skilled in the art may appreciate a variety of outwardly contoured shapes while remaining in the spirit of the invention. Various shapes (not shown) of the foil can also be used such as circular, diamond, oval, rectangular, etc. Adjustment to the frame can be made to accommodate a desired foil shape.

According to the present embodiment referring to FIGS. 1A-1D the closed loops 25*a* and 25*b* of the frame, and the holes 30 and 30*b* of the foil 26 serves as a standard fishing lure pivoting means for the present invention. However, those skilled in the art can appreciate a variety of other standard fishing lure pivoting means such as utilizing a standard hinging mechanism using a hinge; or threading a straight wire through holes 30*a* and 30*b* with a bearing-type element behind the foil. It is to be understood, since there are a variety of ways that those skilled in the art can employ to allow a pivoting motion for lure elements that they would remain within the spirit and scope of the present invention.

Regarding the pivoting ability of the present invention and referring to FIGS. 1A-1D, in FIG. 1B the bend in foil 26 serves as a means to move the center of gravity (and the weight) of the foil away from the alignment of the connection loops 30*a* and 30*b* to promote a more efficient and smoother pivot between the frames appendages. Angle 32 of the frame appendages aid in limiting the pivoting distance of the foil. The frame angle is less than the angle of foil 26 whereby the foil is blocked from pivoting beyond the appendages of frame 25. Also contributing to the limited pivot distance is the graduating width of the foil from its end to its center shown in FIGS. 1C and 1D. Although there are no degree values limiting the angles of the foil and the frame by the present invention, a preferred angle of frame 25 would be less than a preferred angle of foil 26. The present embodiment can be attached to multiple lure types.

Figure 7:
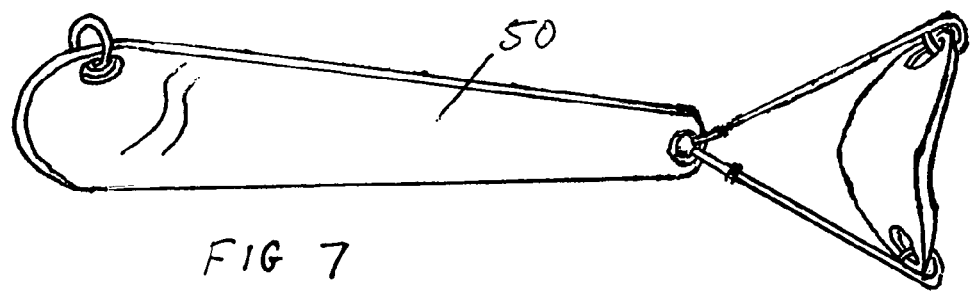
FIG. 7 shows a perspective view of an oscillator trailing a lure, with the frame comprising two separate appendages having separate ends which are adapted to be joined with a fishing lure.

According to another embodiment, in FIG. 7 non-integral, separate appendages extend rearwardly toward foil 26 from a common adjoining base FIG. 7 shows, by way of an example, both appendages each adapted to be joined with a fishing lure and making their own separate connections to the lure. The appendages can be lengths of wire or separate snap swivels, or split rings, or other framing elements that allow a pivotal conenction to a lure. This embodiment can be attached to multiple lure types.

In all embodiments, materials used to make the frame include metal, plastic, wood, nylon, vinyl, cable, and other materials capable of supporting the foil, or, capable of allowing a viable, pivoting connection to a lure.

Figure 11:
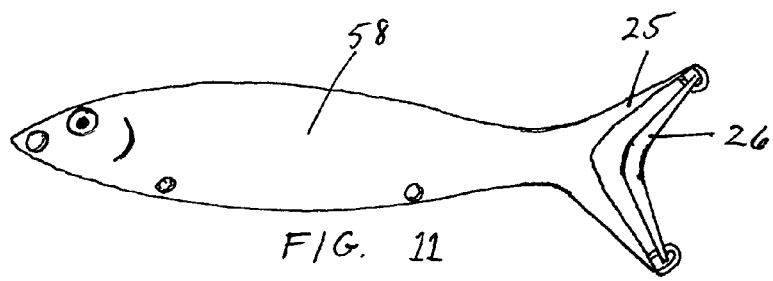
FIG. 11 shows the arms of the frame as integrally formed at their base.

In another embodiment, FIG. 11 shows the appendages as being integrally formed at their base, with foil 26 pivotally attached to each appendage. The example shown is for illustration only and the embodiment is not confined to a lure or any particular lure type, nor is it confined to a fishing lure part, i.e. the frame may take on different shapes and still fall within the spirit of the invention by having 2 integrally formed appendages supporting a foil.

Figure 5:
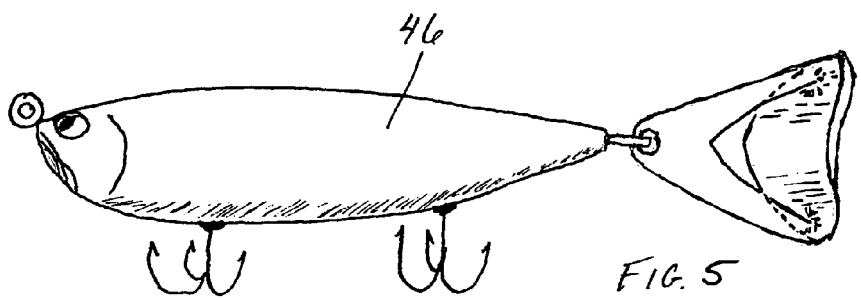
FIG. 5 shows a side view of a vertically positioned oscillator with the frame and foil integrally formed.

In another embodiment FIG. 5 shows integrally formed frame appendages, and foil 26 being integrally formed with frame 25 wherein the frame and foil can be cast from plastic as one piece, be formed from metal or wood, or other material capable of being formed into one piece. This embodiment has means for pivotally attaching to a lure or line by way of an aperture, and may employ a standard hinging device. It can be attached to multiple lure types.

Figure 2A:
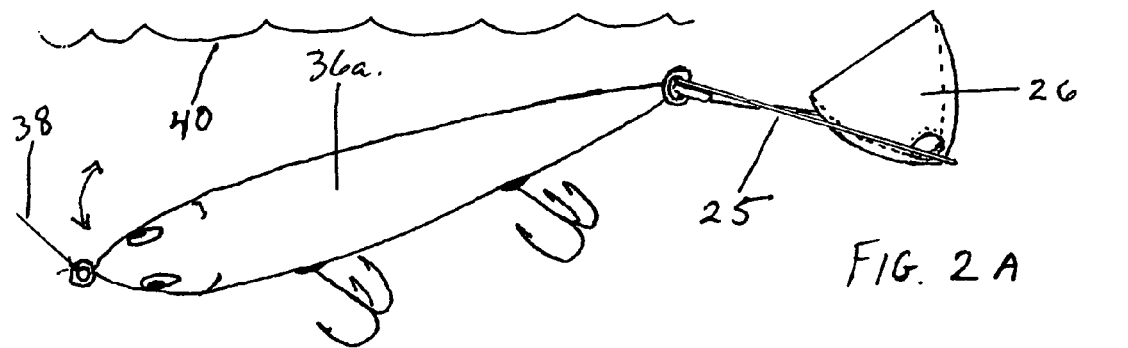
FIGS. 2A and 2B show the oscillator in action as it connected to a minnow lure lying on its side, the oscillator in a horizontal position and demonstrating an up and down oscillation, as well as the effect on the lure.
Figure 2B:
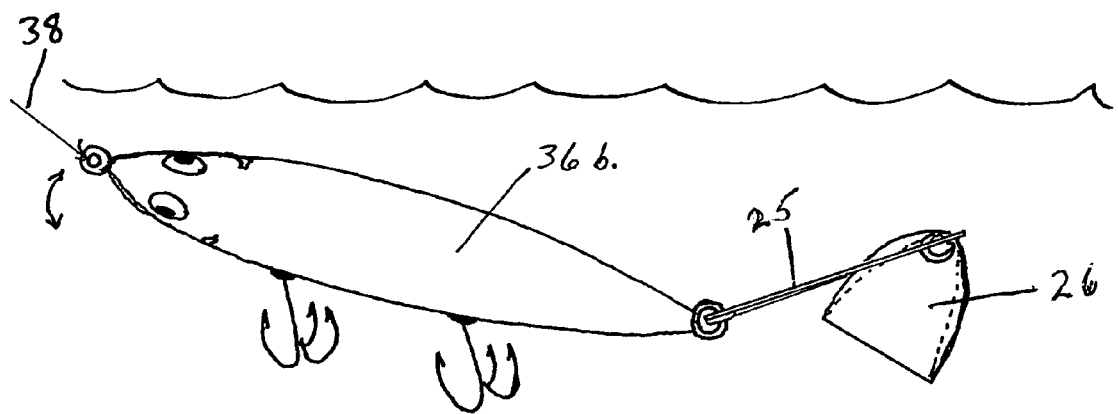
Figure 2C:
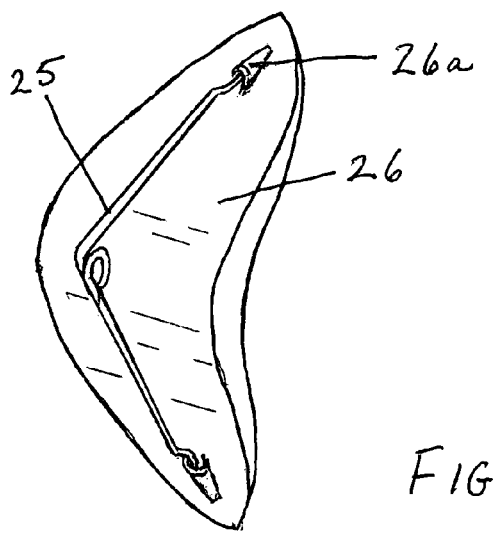
FIG. 2C shows a hinge device comprising a sleeve and frame end for pivoting.

In most embodiments, the framing appendages can be substituted for another material, element, or shape so long as a connection is made near each end of the foil to an appendage and the outwardly contoured portion of the foil is facing a common base to which the appendages are connected. The point at which two appendages converge is considered to be a common base. For example, the coil spring of a frame composed of a wire is a convergence point, and is used as a means for connecting the oscillator to a line or lure. For an integrally formed frame composed of plastic or wood, the means for connection to a line or lure is located at the base of the appendages; this typically would be an aperture in a unitized frame. On the other hand, a means for connecting the oscillator to a lure. For an integrally formed frame composed of plastic or wood, the means for connection to a lure is located at the base of the appendages; this typically would be an aperture in a unitized frame. On the other hand, a means for connecting to a lure can be a hinge device. In FIG. 2C, a sleeve 26a is used to receive a portion of an appendage composed of wire; the sleeve allows foil 26 to hinge around the wire portion similar to the function of a standard hinge. A standard hinge could be used also. The appendages can be attached to a common base connection such as a lure body or a split ring which is linked to a lure; or to an integral loop element on a fishing lure which is typically in the form of a screweye or wire harness loop. The appendages need not be converging to connect to a common base.

In applying and orienting of the present invention to a lure, those skilled in the art can appreciate a variety of means to adjust, modify, and position the fishing lure oscillator while remaining in the scope and spirit of the present invention. Depending on the lure type, fishing technique, or desired action of a lure, the oscillator can be oriented in a vertical or horizontal position with respect to its longitudinal axis and the surface plane of the water. At the same time, the oscillator can be placed behind, in front of, on the side of, above, or below multiple lure types. In some applications the oscillator can be placed between two lure body parts such as the parts of a jointed plug or crankbait.

Figure 3:
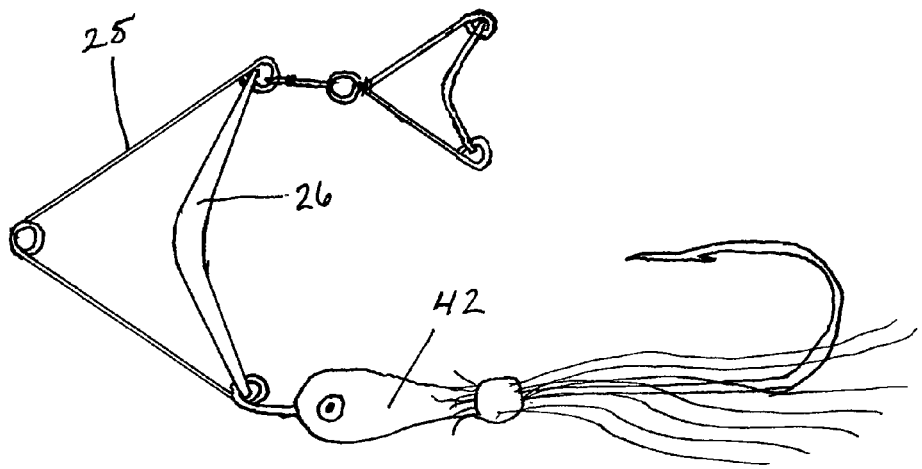
FIG. 3 shows a plurality of oscillators as placed on a spinnerbait-type lure.
Figure 4:
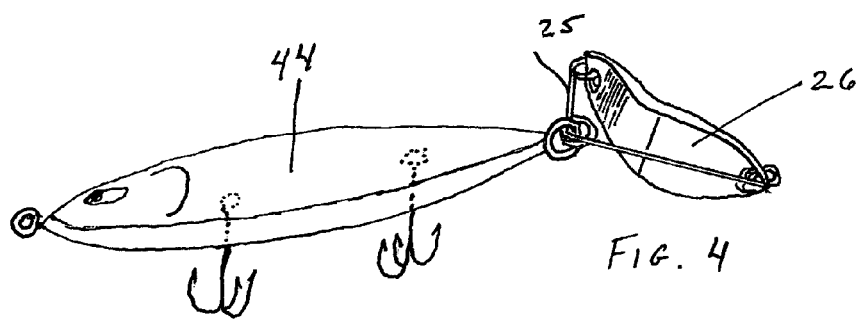
FIG. 4 shows a perspective view of a horizontally positioned oscillator connected to the trailing end of a plug.
Figure 6:
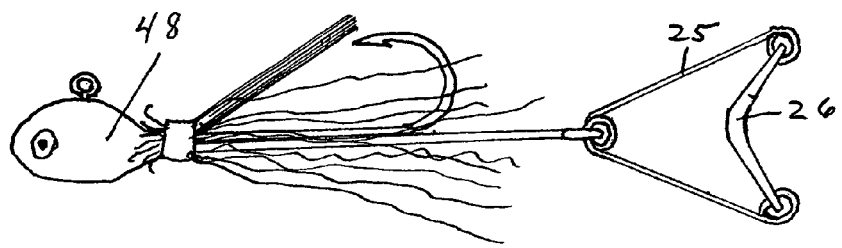
FIG. 6 shows an oscillator trailing behind a jig-type lure.

For illustrating the versatility of the invention only, and not necessarily listing claimed embodiments, some figures are included: FIGS. 2A and 2B show an oscillator trailing a minnow plug lying on its side with the oscillator in a horizontal position. FIG. 3 shows a spinnerbait-type lure with a larger foil 26 and frame 25 to which a fishing line would attach. An additional and smaller foil 26 and frame 25 is attached, as an alternative, above and behind the larger device with the spinnerbait body 42 below. FIG. 4 shows a perspective view of foil 26 and frame 25 horizontally attached to lure 44. FIG. 5 shows an upright swimbait-style lure 46 with a vertically attached, integrally formed foil 26 and frame 25. FIG. 6 shows a jig-type lure 48 with a trailing, vertical oscillator. FIG. 7 shows a spoon-type lure 50 with a trailing oscillator of separate appendage connection to an integral common base. FIG. 8 shows a standard spinnerbait form with an oscillator substituted for a spinning blade above the lure body and optional oscillator 130 attached to the hook. Both accessories are vertically oriented but they can be placed horizontally (not shown).

Figure 12:
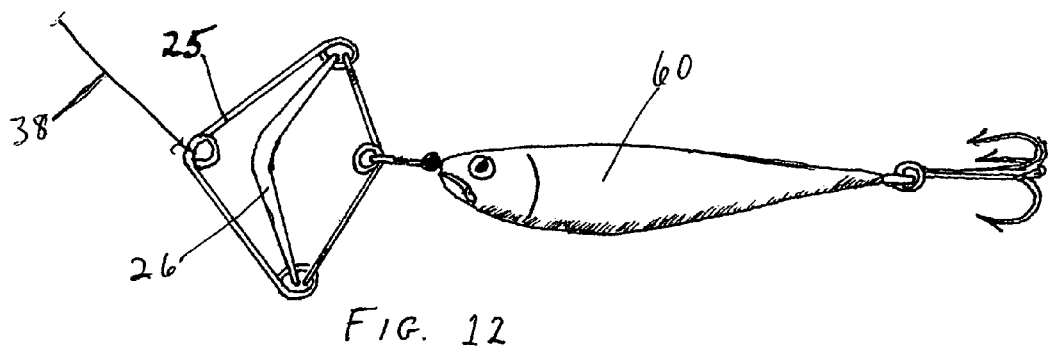
FIG. 12 shows an in-line spinner-type lure with an oscillator substituted for a spinning blade leading the lure body.

FIG. 11 shows a lure 58 with appendages integrally formed at its base and with foil 26 pivotally attached. FIG. 12 shows line 38 directly tied to the oscillator and an in-line spinner-type lure 60 trailing. Various foil orientations and oscillator positions on multiple lures can be combined while remaining within the scope and spirit of the present invention.

In operation, and referring to FIG. 1D, foil 26 is disposed lengthwise between the appendages' ends of frame 25 with the transverse axis of foil 26 perpendicular to the plane of the appendages, the bend of foil 26 in FIG. 1B is projecting toward the direction from which the framing appendages originate either at an embodiment's frame connector 28, or from a common base having been adapted to be joined with a lure. When connected to a lure and pulled through a body of water, the contoured surface of foil 26 resists and deflects water whereby the foil is forced into an oscillation, pivoting to and fro unobstructedly in the space between frame 25 appendages. The foil pivots about its longitudinal axis and in a path perpendicular to the plane of the appendages. The same oscillating motion of the foil is transferred to the lure.

In FIGS. 2A and 2B, the oscillator is horizontally attached to a lure 36a and 36b lying on its side with reference to the water surface 40. FIG. 2A shows foil 26 in one pivot position and the effect on lure 36a; FIG. 2B shows the foil 26 in the opposite position and the effect on lure 36b. When disposed in a horizontal plane the foil has a vertical, or up and down oscillation, likewise the lure to which it is attached. When disposed in a vertical plane the foil has a horizontal, or side to side oscillation, likewise the lure to which it is attached. Referring to FIG. 5 lure 46 would have a side to side motion with a vertical foil 26.

In an embodiment in FIGS. 1A-1D, the pivoting distance of the foil is limited by the appendages and closed loops 25a and 25b of frame 25 wherein foil 26 is stopped in one direction by contact with one appendage and closed loop, the foil immediately pivots in the opposite direction and is stopped by contact with the opposite appendage and loop.

The frequency at which the foil pivots can be controlled by a number of modifications. An increase in water resistance of foil 26 can be made by increasing the angle 32 in FIG. 1B so that the flat portions 34 on the front side facing water flow are more upright and relatively closer to being perpendicular to the flow of water against foil 26. By increasing angle 32 of the bend, the foil will pivot with less frequency. Likewise, by decreasing the angle of the bend, the foil will pivot with more frequency. Proper angle adjustments of the frame must be made to correspond with angle adjustments of the foil. More resistance results in fewer pivots; less water resistance results in more pivots, due in part, to the shifting of the foil's center of gravity. Other factors contributing to the frequency of pivots are the thickness of the foil's material, the material's weight, and the speed of water flowing against the foil. Thus, the distance and frequency of pivots can be strictly controlled by incorporating different variables of both the frame and foil, combined with the relative speed at which water flows against the foil.

The depth at which particular applications and/or embodiments of the present invention travel in the water can be controlled. If a particular fishing technique or lure is desired in which the depth of presentation is important and the oscillator is vertically oriented, adjustments to the appendage of the frame or the foil can be made. For a deeper presentation with a spinnerbait-type lure for example, the top appendage of the frame can be made longer in length than the bottom appendage thereby creating unequal (more) water pressure to the top flat portions of the foil (opposed to equal water pressure when the appendages are of equal length) pushing the foil and lure downward. For a shallower presentation on the same lure, the bottom appendage can be made longer whereby unequal (more) pressure is applied to the bottom flat portion of the foil, pushing the foil and lure upward.

In similar fashion, the bend of the foil can be made off center, with the radius of the bend closer to an end of the foil thereby creating unequal surface areas with respect to the flat portions on each side of the bend. The same steps as described above using the foil instead of the frame produces the same results.

Accordingly, the reader will see that the fishing lure oscillator of this invention can be used to impart vertical or horizontal oscillations to multiple lure types. Modifications can be made to the frame and foil to control the depth at which a fishing lure travels in water. Additional adjustments can be made to control the amount of water pressure applied to the oscillator thereby effectively controlling the frequency of oscillation of a lure when drawn through water.

Moreover, the oscillator can be vertically or horizontally connected to a variety of lure types including, but not limited to, minnow plugs, crankbaits, spinnerbait-types, buzz bait types, in-line spinner-types, spoons, bladebait-types, jig types, flasher/dodger/trolling rigs, swimbait-types, trolling decoys, and flies. On each of these lures, the oscillator can be placed in front of, behind, on the side of, below, or above a lure, or between body parts such as a placement between parts of a jointed lure.

Although the description above contains many specificities, these should not be construed as limiting the scope of the invention but as merely providing illustrations of some of the embodiments of this invention. Other variations and combinations of lures and oscillators are possible.

What is claimed is:

1. A fishing lure oscillator comprising, in combination:
   a frame comprising a first appendage and a second appendage each originating at and projecting distally away from a common proximal base adapted to couple the frame to a fishing lure, said appendages being disposed in a coplanar formation, and,
   an elongate water deflecting foil having a longitudinal axis, at least one bend formed about a bend axis perpendicular to said longitudinal axis, thereby having an outwardly contoured surface portion,
   said appendages of said frame projecting distally towards said foil wherein a first end of said foil is pivotally mounted to a distal end of said first appendage, and an opposite second end of said foil is pivotally mounted to a distal end of said second appendage,
   wherein said longitudinal axis of said foil is disposed essentially parallel to a common plane of said appendages, said foil has at least a portion of its outwardly contoured surface area facing said common proximal base, whereby said foil pivots about said longitudinal axis in a space between said appendages of said frame when said foil is pulled with the fishing lure while so coupled through a body of water in a forward direction with said appendages cooperating to support the foil in a select orientation in which the longitudinal axis is substantially perpendicular to the forward direction.

2. The fishing lure oscillator of claim 1 wherein said first and second appendages are integrally formed, with a convergent point of said appendages defining said common proximal base.

3. The fishing lure oscillator of claim 1 wherein said frame comprises a substantially v-shaped configuration composed of wire material in the form of a safety pin-type coil spring, thereby providing a means to attach the frame to a fishing lure.

4. The fishing lure oscillator of claim 1 wherein said bend axis is proximate a central portion of said foil and wherein surface portions of said foil adjacent to said bend are relatively flat.

5. A fishing component oscillator, including:
   a frame having common base adapted to connect the frame to a fishing component to be pulled with the fishing component through water in a forward flow direction, the frame further having a first appendage extending from the common base to a distal end and a second appendage extending from the common base to a distal end in coplanar fashion relative to the first appendage, wherein said appendages converge to form an apex portion of a substantially v-shaped frame, said apex portion being integrally formed with said appendages and defining said common base; and
   an elongate water deflecting foil having a first end region pivotally coupled to the distal end of the first appendage at a first location, and a second and opposite end region pivotally coupled to the distal end of the second appendage at a second location, said first and second locations being disposed on a longitudinal axis of the foil, wherein the foil is curved about a transverse axis to define a convex foil surface between the first and second end regions;
   wherein the frame, when so connected and so pulled, supports the foil with respect to the fishing component in a select orientation such that the longitudinal axis remains substantially perpendicular to the flow direction, and further supports the foil for pivotal oscillation with respect to the fishing component about an axis parallel to the longitudinal axis while limiting a range of said pivotal oscillation such that the convex foil surface, over said range, faces in the forward flow direction.

6. The oscillator of claim 5 wherein:
   the first and second appendages are disposed to contact the foil during the pivotal oscillation of the foil and thereby limit said range.

7. The oscillator of claim 5 wherein:
   the first and second distal ends of the appendages are coupled respectively to the first and second end regions in a manner to limit pivoting of the foil relative to the frame and thereby limit said range.

8. The oscillator of claim 5 wherein:
   the common base is adapted to connect the frame pivotally relative to the fishing component about an axis parallel to the longitudinal axis.

9. The oscillator of claim 8 wherein:
   said distal ends of the appendages and said end regions are adapted to couple the foil to pivot relative to the frame about the longitudinal axis.

* * * * *